United States Patent
Komori et al.

(10) Patent No.: US 12,462,952 B2
(45) Date of Patent: Nov. 4, 2025

(54) CABLE WITH ABNORMALITY PRECURSOR DETECTION FUNCTION AND ELECTRIC WIRE ABNORMALITY PRECURSOR DETECTION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Osaka (JP); Makoto Higashikozono, Osaka (JP); Fujio Sonoda, Osaka (JP); Takahiro Murata, Mie (JP); Kenta Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 133 days.

(21) Appl. No.: 18/035,866

(22) PCT Filed: Jun. 3, 2021

(86) PCT No.: PCT/JP2021/021194
§ 371 (c)(1),
(2) Date: May 8, 2023

(87) PCT Pub. No.: WO2022/107364
PCT Pub. Date: May 27, 2022

(65) Prior Publication Data
US 2023/0420158 A1    Dec. 28, 2023

(30) Foreign Application Priority Data

Nov. 20, 2020 (JP) .................. 2020-193786

(51) Int. Cl.
H01B 7/32       (2006.01)
G01R 31/58      (2020.01)
H01B 13/24      (2006.01)

(52) U.S. Cl.
CPC ............... *H01B 7/32* (2013.01); *G01R 31/58* (2020.01); *H01B 13/24* (2013.01)

(58) Field of Classification Search
CPC .......... H01B 7/32; H01B 13/24; G01R 31/58; G01R 31/083
See application file for complete search history.

(56) References Cited

U.S. PATENT DOCUMENTS

2013/0222002 A1    8/2013  Eshima et al.
2015/0107872 A1*   4/2015  Wehrli ............... H01B 11/1008
                                              174/109

FOREIGN PATENT DOCUMENTS

JP    H05340985 A  * 12/1993
JP    H10-125141 A    5/1998
(Continued)

OTHER PUBLICATIONS

International Search Report issued on Aug. 24, 2021 for WO 2022/107364 A1 (4 pages).

*Primary Examiner* — Feba Pothen
(74) *Attorney, Agent, or Firm* — Venjuris, P.C.

(57) ABSTRACT

A cable with an abnormality precursor detection function includes: one or more target electric wires each including a corresponding one of electric wire conductors and an electric wire coating that covers an outer periphery of the electric wire conductor; one or more detection wires each including a corresponding one of detection wire conductors and a (Continued)

detection wire coating that covers an outer periphery of the detection wire conductor; and a sheath that covers an outer periphery of an electric wire group including the one or more target electric wires and the one or more detection wires.

9 Claims, 4 Drawing Sheets

(56) References Cited

FOREIGN PATENT DOCUMENTS

| | | | | |
|---|---|---|---|---|
| JP | H10-326526 | A | | 12/1998 |
| JP | 2006059736 | A | * | 3/2006 |
| JP | 2007-299608 | A | | 11/2007 |
| JP | 2007305478 | A | * | 11/2007 |
| JP | 2010-252465 | A | | 11/2010 |
| JP | 2020071928 | A | * | 5/2020 ......... H01B 13/0036 |

* cited by examiner

CABLE WITH ABNORMALITY PRECURSOR DETECTION FUNCTION AND ELECTRIC WIRE ABNORMALITY PRECURSOR DETECTION DEVICE

CROSS REFERENCE TO RELATED APPLICATIONS

This application is a national phase of PCT application No. PCT/JP2021/021194, filed on 3 Jun. 2021, which claims priority from Japanese patent application No. 2020-193786, filed on 20 Nov. 2020, all of which are incorporated herein by reference.

TECHNICAL FIELD

The present disclosure relates to a cable with an abnormality precursor detection function and an electric wire abnormality precursor detection device.

BACKGROUND

Electric wires are installed or laid in various kinds of electrical and electronic equipment, transportation equipment, buildings, public facilities, etc. Long-term use of electric wires may lead to damage such as breaks in electric wires. For example, when an electric wire is repeatedly subjected to bending or vibration, the conductor included in the electric wire may break due to metal fatigue. It is preferable to detect damage such as a break in an electric wire at a precursory stage such as a stage where metal fatigue is progressing, before the damage actually occurs. If it is possible to detect damage in an electric wire at the precursory stage, measures such as replacing the electric wire can be taken to prevent problems caused by damage to the electric wire, such as a malfunction in equipment provided with the electric wire.

As a cable intended to detect a precursor of damage in an electric wire, for example, Patent Document 1 discloses a cable with a break detection function including: a detection wire including a conductor formed by twisting a plurality of strands together; and a detected wire (i.e. a wire to be detected) including a conductor formed by twisting a plurality of strands together, wherein the twist pitch of the conductor of the detection wire is larger than the twist pitch of the conductor of the detected wire. By making the twist pitch of the conductor of the detection wire larger than the twist pitch of the conductor of the detected wire, the bending life of the detection wire is made shorter than the bending life of the detected wire in order to predict a break.

Patent Document 2 discloses a break detection device including: an electric cable composed of a plurality of electric wires, an electric shield layer covering the plurality of electric wires, and a sheath covering the electric shield layer; a break detection wire provided in the electric shield layer and composed of a conductor wire and an insulating layer around the outer periphery of the conductor wire; a voltage source electrically connected to the conductor wire; a first detector electrically connected to the conductor wire; and a second detector electrically connected to the electric shield layer. The bending life of the break detection wire is set to be shorter than the bending life of the electric wires. A voltage is applied to the conductor wire of the break detection wire from a voltage source, and a break in the electric shield layer is predicted based on a detection signal from the first detector and a detection signal from the second detector.

PRIOR ART DOCUMENT

Patent Document

Patent Document 1: JP 2013-182716 A
Patent Document 2: JP 2007-305478 A

SUMMARY OF THE INVENTION

Problems to be Solved

As described in Patent Documents 1 and 2, by providing, together with a target electric wire for which a precursor of a break is to be detected, a detection wire that is more likely to be fractured by bending than the target electric wire and monitoring for a fracture in the detection wire, a precursor of a break in the target electric wire can be detected. However, simply providing the detection wire does not necessarily enable highly sensitive detection of a break in the target electric wire. In Patent Document 1, a detection wire and a plurality of detected wires are collectively covered with a sheath. In Patent Document 2, a plurality of electric wires are covered with an electric shield layer provided with a break detection wire. In the structures described in Patent Documents 1 and 2, there is a gap between a plurality of target electric wires and a covering member that covers the outer periphery of the plurality of target electric wires, i.e. a sheath or an electric shield layer, and the plurality of target electric wires can move in the space surrounded by the covering member. If such movement of a target electric wire occurs while the target electric wire is repeatedly subjected to bending or vibration, the positional relationship between the target electric wire and the detection wire may vary ununiformly depending on the position in the axial direction of the cable. In other words, there is a possibility that the relative positions of the target electric wire and the detection wire may differ depending on the position in the axial direction.

In such a case, the relationship between the load exerted on target electric wires and the load exerted on the detection wire in response to bending or vibration varies depending on the position in the axial direction. Consequently, even when the same load is applied to the target electric wire in response to bending or vibration, depending on the load application position in the axial direction, there are cases where the detection wire fractures and a precursor of a break in a target electric wire can be detected and cases where the detection wire does not fracture and a precursor of a break in a target electric wire cannot be detected. Thus, there is a possibility that the sensitivity in detecting a precursor of a break in the target electric wires varies depending on the position.

When detecting a precursor of damage such as a break in an electric wire, it is preferable that a precursor of damage at any position in the axial direction can be detected with the same sensitivity. Predicting where damage will occur in an electric wire in equipment such as an automobile is difficult. Regardless of where damage occurs, however, such damage can lead to problems such as an equipment malfunction. It is therefore important to detect a precursor of damage in the electric wire regardless of where damage occurs and to take measures such as replacing the electric wire. In particular, it is desirable to detect a precursor of damage in an electric wire with high sensitivity in parts that would be significantly affected by damage to the electric wire, such as the braking system of an automobile.

In view of the above, an object is to provide a cable with an abnormality precursor detection function and an electric wire abnormality precursor detection device capable of detecting a precursor of a break in an electric wire with the same sensitivity regardless of the position in the axial direction of the electric wire.

Means to Solve the Problem

A cable with an abnormality precursor detection function according to the present disclosure includes: one or more target electric wires each including an electric wire conductor and an electric wire coating that covers an outer periphery of the electric wire conductor; one or more detection wires each including a detection wire conductor and a detection wire coating that covers an outer periphery of the detection wire conductor; and a sheath that covers an outer periphery of an electric wire group including the one or more target electric wires and the one or more detection wires, wherein the detection wire conductor has lower bending resistance than the electric wire conductor, and the sheath is an extruded body that is directly in close contact with the outer periphery of the electric wire group or is in close contact with a surface of an inner peripheral layer that is in close contact with the outer periphery of the electric wire group and covers the electric wire group.

An electric wire abnormality precursor detection device according to the present disclosure includes: a measurement unit; and a notification unit, wherein the measurement unit is configured to measure a characteristic impedance of the detection wire conductor in the foregoing cable with an abnormality precursor detection function, and the notification unit is configured to make notification to the outside regarding a precursor of a break in the target electric wire, in the case where a change in the characteristic impedance of the detection wire conductor measured by the measurement unit is not less than a reference value.

Effect of the Invention

The cable with an abnormality precursor detection function and the electric wire abnormality precursor detection device according to the present disclosure are capable of detecting a precursor of a break in an electric wire with the same sensitivity regardless of the position in the axial direction of the electric wire.

DETAILED DESCRIPTION TO EXECUTE THE INVENTION

Description of Embodiments of the Present Disclosure

First, embodiments of the present disclosure will be described below.

A cable with an abnormality precursor detection function according to an embodiment of the present disclosure includes: one or more target electric wires each including an electric wire conductor and an electric wire coating that covers an outer periphery of the electric wire conductor; one or more detection wires each including a detection wire conductor and a detection wire coating that covers an outer periphery of the detection wire conductor; and a sheath that covers an outer periphery of an electric wire group including the one or more target electric wires and the one or more detection wires, wherein the detection wire conductor has lower bending resistance than the electric wire conductor, and the sheath is an extruded body that is directly in close contact with the outer periphery of the electric wire group or is in close contact with a surface of an inner peripheral layer that is in close contact with the outer periphery of the electric wire group and covers the electric wire group.

The cable with an abnormality precursor detection function includes the detection wire including the detection wire conductor that has lower bending resistance than the electric wire conductor of the target electric wire. Therefore, when a load is repeatedly applied to the cable with an abnormality precursor detection function by bending or vibration, the detection wire fractures in a shorter period of time than the target electric wire. By detecting, upon the occurrence of the fracture in the detection wire, the fracture of the detection wire through electric measurement such as measurement of characteristic impedance, a precursor of a break in the target electric wire can be detected before the target electric wire breaks. The sheath that covers the outer periphery of the electric wire group including the target electric wire and the detection wire is provided as an extruded body that is directly in close contact with the outer periphery of the electric wire group or is in close contact with the inner peripheral layer that is in close contact with the outer periphery of the electric wire group and covers the electric wire group. Hence, the positional relationship between the target electric wire and the detection wire is unlikely to deviate in the region inside the sheath. Therefore, the same relative positional relationship between the target electric wire and the detection wire can be maintained at each position in the axial direction of the cable, and the same relationship between the load exerted on the target electric wire and the load exerted on the detection wire by bending or the like can be maintained at each position in the axial direction. This makes it possible to detect a precursor of a break in the target electric wire from a fracture of the detection wire with high sensitivity regardless of the position in the axial direction of the cable.

The one or more detection wires may include a plurality of detection wires, and respective detection wire conductors included in the plurality of detection wires may differ in bending resistance from each other. Of the plurality of detection wires, each detection wire including a detection wire conductor with low bending resistance fractures even when subjected to a small load, so that, upon the occurrence of the fracture, a precursor of a break in the target electric wire can be detected well in advance. Meanwhile, each detection wire including a detection wire conductor with high bending resistance does not fracture until a large load is applied, so that, upon the occurrence of the fracture, the increasing possibility of a break in the target electric wire can be detected. Thus, by detecting which detection wire conductor has fractured, a precursor of a break in the target electric wire can be detected in stages according to the degree of urgency of the break.

In this case, the plurality of detection wires may include a first detection wire including a first detection wire conductor and a second detection wire including a second detection wire conductor, the first detection wire conductor may be composed of a strand of a first metal material, and the second detection wire conductor may be composed of a strand of a second metal material that has higher bending resistance than the first metal material. Thus, the second detection wire conductor has higher bending resistance than the first detection wire conductor. In this way, the difference in bending resistance between the metal materials can be used to provide two detection wire conductors differing in bending resistance. These detection wire conductors enable detection in stages of a precursor of a break in the target electric wire. In the case of using alloys such as copper alloys as the metal materials, the bending resistance of each metal material can be widely controlled according to the type and amount of each additive element and the production method, and various detection wires can be provided depending on the degree of urgency of a precursor of a break to be detected.

The plurality of detection wires may further include a third detection wire including a third detection wire conductor, and the third detection wire conductor may include both a strand of the first metal material and a strand of the second metal material, and have a bending resistance that is higher than a bending resistance of the first detection wire conductor and lower than a bending resistance of the second detection wire conductor. Thus, with a simple structure using only strands made of two types of metal materials, a precursor of a break in the target electric wire can be detected in three or more stages.

The one or more target electric wires may include a plurality of target electric wires, and the plurality of target electric wires may surround the one or more detection wires. Thus, whichever target electric wire out of the plurality of target electric wires has a precursor of a break, the precursor can be detected with high sensitivity by the common detection wire.

The cable with an abnormality precursor detection function may further include an outer detection layer that is a layer-like member including a conductive member, between the sheath and the electric wire group. When the cable with an abnormality precursor detection function is subjected to a sudden impact or an external flaw, the conductive member included in the outer detection layer may be damaged. By detecting such damage to the conductive member through electric measurement such as measurement of characteristic impedance, a precursor of damage such as a break or an external flaw in the target electric wire caused by the application of an impact or formation of an external flaw can be detected. The detection wire included in the electric wire group is suitable for detecting a precursor of a break in the target electric wire due to metal fatigue caused by bending or vibration, whereas the outer detection layer located outside the electric wire group is suitable for detecting a precursor of a break in the target electric wire due to the application of a sudden impact or an external flaw in the target electric wire due to contact or friction with an external object. The cable including both the detection wire and the outer detection layer can detect precursors of a plurality of types of damage with different causes in the target electric wire with high sensitivity.

In this case, the conductive member included in the outer detection layer may be a metal layer having a thickness less than a diameter of the detection wire conductor. Since damage such as a fracture can easily occur in the outer detection layer, due to the application of an impact, contact with an external object, etc., a precursor of damage in the target electric wire can be detected sensitively.

The outer detection layer may be composed of conductive tape, and surround the electric wire group. Moreover, the conductive tape may be spirally wound around the electric wire group with a gap between turns. Alternatively, the outer detection layer may be composed of laminated tape, and the laminated tape may include a substrate that is a tape-shaped insulator or semiconductor and conductive covering layers formed on two surfaces of the substrate, and surround the electric wire group. Regardless of the form of the outer detection layer, the outer detection layer having a simple structure enables sensitive detection of a precursor of damage in the target electric wire due to the application of an impact or an external flaw.

An electric wire abnormality precursor detection device according to an embodiment of the present disclosure includes: a measurement unit; and a notification unit, wherein the measurement unit is configured to measure a characteristic impedance of the detection wire conductor in the foregoing cable with an abnormality precursor detection function, and the notification unit is configured to make a notification to the outside regarding a precursor of a break in the target electric wire, in the case where a change in the characteristic impedance of the detection wire conductor measured by the measurement unit is not less than a reference value.

By detecting a fracture of the detection wire conductor based on a change in the characteristic impedance of the detection wire conductor, the electric wire abnormality precursor detection device can detect a precursor of a break in the target electric wire and make a notification regarding the precursor to the outside. In the cable with an abnormality precursor detection function to be detected, the relative positions of the target electric wire and the detection wire are unlikely to deviate in the region inside the sheath formed as an extruded body, because of the close contact with the sheath. This makes it possible to detect a precursor of a break in the target electric wire with high sensitivity regardless of the position in the axial direction of the cable and make a notification regarding the precursor to a user or the like.

The measurement unit may be configured to measure, in addition to the characteristic impedance of the detection wire conductor, a characteristic impedance of the conductive member included in the outer detection layer in the cable with an abnormality precursor detection function including the outer detection layer including the conductive member between the sheath and the electric wire group, and the notification unit may be configured to make a notification to the outside regarding a precursor of damage in the target electric wire, in the case where a change in the characteristic impedance of the conductive member measured by the measurement unit is not less than a reference value. It is thus possible to detect, with high sensitivity, not only a precursor of a break in the target electric wire due to metal fatigue caused by bending or vibration but also a precursor of a break in the target electric wire due to application of a sudden impact or a precursor of an external flaw due to contact or friction with an external object and notify the precursor to the user or the like.

Details of Embodiments of the Present Disclosure

A cable with an abnormality precursor detection function and an electric wire abnormality precursor detection device according to an embodiment of the present disclosure will be described in detail below, with reference to the drawings. The cable with an abnormality precursor detection function according to the embodiment of the present disclosure is a cable capable of detecting a precursor of damage in a target electric wire included in the cable. The electric wire abnormality precursor detection device according to the embodiment of the present disclosure is a detection device capable of detecting a precursor of damage in a target electric wire in the cable with an abnormality precursor detection function according to the embodiment of the present disclosure.

Figure 1:
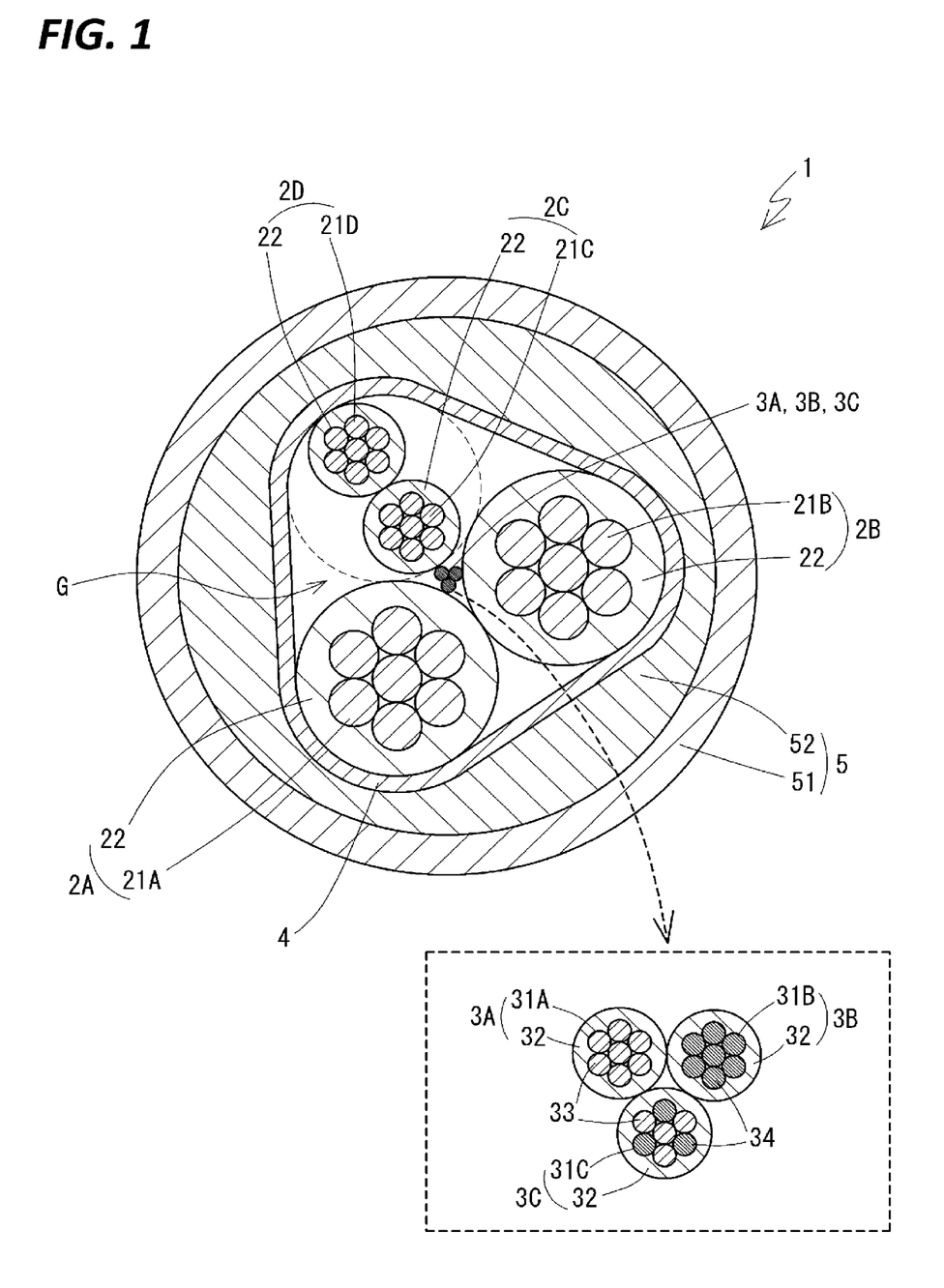
FIG. 1 is a cross-sectional view showing the structure of a cable with an abnormality precursor detection function according to a first embodiment of the present disclosure, including an enlarged view of detection wires within a box.

First Embodiment (1) Structure of Cable with Abnormality Precursor Detection Function First, a cable with an abnormality precursor detection function (hereinafter also simply referred to as a cable) according to a first embodiment of the present disclosure will be described below. FIG. 1 shows the structure of a cable 1 with an abnormality precursor detection function according to the first embodiment of the present disclosure, in a cross-sectional view perpendicular to the axial direction. The cable 1 with an abnormality precursor detection function includes at least one target electric wire 2 (2A to 2D), at least one detection wire 3 (3A to 3C), a tape layer 4, and a sheath 5. FIG. 1 includes an enlarged view of the detection wire 3 within a box.

Each target electric wire 2 is an electric wire that achieves functions required in equipment, such as power supply, voltage application, or communication, and is an electric wire in the cable 1 for which a precursor of damage is to be detected. The number of target electric wires 2 is not limited, and may be one or more. The number of target electric wires 2 is preferably more than one. Each target electric wire 2 includes an electric wire conductor 21 (21A to 21D) formed as a conductor wire, and an electric wire coating 22 made of an insulating material and covering the outer periphery of the electric wire conductor 21. In FIG. 1, the cable 1 includes four target electric wires 2A to 2D. Of these four target electric wires, two are feeder wires 2A and 2B. The other two are signal wires 2C and 2D whose conductor cross-sectional areas are smaller than those of the feeder wires 2A and 2B, and are twisted together to form a twisted pair. In FIG. 1, the outer edge of the twisted pair is indicated by a dashed line. For example, the conductor cross-sectional area of each of the feeder wires 2A and 2B is 1.8 mm$^2$ to 2.5 mm$^2$, and the conductor cross-sectional area of each of the signal wires 2C and 2D is 0.25 mm$^2$.

The detection wire 3 is an electric wire for detecting, using fracturing of the same, that there is a precursor of a break in the target electric wire 2, as described later. The detection wire 3 includes a detection wire conductor 31 (31A to 31C) formed as a conductor wire and detection wire coatings 32 made of an insulating material and covering the outer periphery of the respective detection wire conductors 31. The number of detection wires 3 is not limited, and may be one or more. Preferably, a plurality of detection wires 3 are included in the cable 1. In the drawing, three detection wires 3A to 3C are included in the cable 1. Each detection wire conductor 31 has lower bending resistance than the electric wire conductor 21 of the target electric wire 2. In this specification, the bending resistance of a conductor indicates the fracturability of the conductor when subjected to bending, and can be evaluated, for example, as the number of times the conductor can be bent repeatedly at a predetermined angle until it fractures. A larger number of times the conductor is bent indicates higher bending resistance. In the case where the cable 1 includes a plurality of target electric wires 2, the bending resistance of the detection wire conductor 31 is lower than the bending resistance of the electric wire conductor 21 of each of the plurality of target electric wires 2. In the case where the cable 1 includes the feeder wires 2A and 2B and the signal wires 2C and 2D, the signal wires 2C and 2D having a smaller conductor cross-sectional area than the feeder wires 2A and 2B typically have lower bending resistance. The bending resistance of the detection wire conductor 31 is lower than the bending resistance of the signal wires 2C and 2D. In the case where the cable 1 includes a plurality of detection wires 3, the bending resistance of the detection wire conductor 31 of each of the detection wires 3 is lower than the bending resistance of the electric wire conductor 21 of each of the target electric wires 2.

In the case where a plurality of detection wires 3 are provided, these detection wires 3 preferably differ in bending resistance of the detection wire conductor 31. In FIG. 1, a first detection wire 3A, a second detection wire 3B, and a third detection wire 3C respectively include detection wire conductors 31A to 31C that differ in bending resistance. The first detection wire conductor 31A included in the first detection wire 3A has the lowest bending resistance. The second detection wire conductor 31B included in the second detection wire 3B has the highest bending resistance. The third detection wire conductor 31C included in the third detection wire 3C has intermediate bending resistance higher than the bending resistance of the first detection wire conductor 31A and lower than the bending resistance of the second detection wire conductor 31B.

An example of a means of making the bending resistance different between the conductor 21 of each target electric wire 2 and the conductor 31 of each detection wire 3 and between the conductors 31 of the respective detection wires 3 is as follows. In the case where the same strands are included in each twisted wire conductor, the bending resistance is increased as the number of strands is increased. In the case where the number and material of the strands included in each conductor are the same, the bending resistance is increased when the thickness of each strand included in the conductor is increased. Moreover, in the case where the metal material forming the conductor exhibits higher bending resistance as a material property, for example, in the case where the metal material has a higher Young's modulus, a higher rigidity modulus, or a higher bending strength, the bending resistance of the conductor is increased. Furthermore, the bending resistance of the conductor is increased when the twist pitch of the strands in the conductor is reduced, as described in Patent Document 1.

In FIG. 1, the strands included in each detection wire 3 are thinner than the strands included in each target electric wire 2. The respective detection wire conductors 31 of the three detection wires 3 each include the same number of strands of the same diameter, but the strands included in each detection wire conductor 31 are made of a metal material differing in bending resistance as a material property thereof. Specifically, the first detection wire conductor 31A having the lowest bending resistance is entirely composed of strands 33 made of a first metal material having relatively low bending strength. The second detection wire conductor 31B having the highest bending resistance is entirely composed of a plurality of strands 34 made of a second metal material. The second metal material has higher bending resistance than the first metal material as a material property. That is, the second metal material has higher bending strength than the first metal material, and exhibits higher bending resistance than the first metal material when the strands made of the second metal material and the strands made of the first metal material have the same diameter. The third detection wire conductor 31C having the intermediate bending resistance includes both strands 33 made of the first metal material and strands 34 made of the second metal material. In the case of using alloys as the metal materials forming the strands 33 and 34, various bending resistances can be obtained according to the type and amount of each additive element and the production method. Preferred examples include using copper (soft copper) as the first metal material and a second copper alloy as the second metal material, and using a first copper alloy having relatively low bending strength as the first metal material and a second copper alloy having higher bending strength than the first copper alloy as the second metal material.

In the cable 1, all of the target electric wires 2 and the detection wires 3 are grouped together to form an electric wire group G. In the electric wire group G, the relative arrangement of the target electric wires 2 and the detection wires 3 is not limited, but it is preferable that the detection wires 3 are located at the center and the plurality of target electric wires 2 are located around the detection wires 3. In the case where there is more than one detection wire 3, the plurality of detection wires 3 are preferably located at the center together. The detection wires 3 and the target electric wires 2 may be simply bundled together as an electric wire bundle, but it is preferable to position the detection wires 3 at the center and spirally wind the target electric wires 2 around the detection wires 3.

The tape layer 4 serving as an inner peripheral layer is provided around the outer periphery of the electric wire group G. The tape layer 4 serves to hold together the target electric wires 2 and the detection wires 3 included in the electric wire group G so as not to separate from each other. The form and material of the tape layer 4 are not limited, but it is preferable to, for example, spirally wind a tape body made of an insulating material such as paper or resin around the electric wire group G. The tape layer 4 is in close contact with the electric wire group G. That is, the tape layer 4 is in close contact with the outer peripheral surfaces of the outermost electric wires (the target electric wires 2A, 2B, and 2D in this example) of the electric wire group G from among the electric wires 2A to 2D and 3A to 3C included in the electric wire group G.

The sheath 5 is an extruded body made of an insulator mainly made of a polymer material, and surrounds the outer periphery of the tape layer 4 to form the outermost periphery of the entire cable 1. The sheath 5 is in close contact with the outer periphery of the tape layer 4. In other words, the sheath 5 is in contact with the tape layer 4 over the entire outer periphery of the tape layer 4 with no gap between the sheath 5 and the tape layer 4 except for where it is inevitable. The sheath 5 may be composed of one layer or a plurality of layers. In FIG. 1, the sheath 5 is composed of two layers, an outer layer 51 and an inner layer 52, wherein the outer layer 51 is made of a material superior in mechanical properties such as wear resistance to the inner layer 52.

(2) Break Detection Method

When the cable 1 described above is placed in equipment or the like and repeatedly subjected to bending or vibration during use, there is a possibility that metal fatigue will accumulate in the electric wire conductor 21 included in each target electric wire 2 and a break will ensue. If the target electric wire 2 breaks, the target electric wire 2 cannot perform its function such as power supply or communication. This may hinder normal functioning of the equipment in which the cable 1 is located. The break in the target electric wire 2 may also cause problems such as an equipment failure.

The cable 1 according to this embodiment includes, in addition to the target electric wire 2 that performs a predetermined function in equipment or the like, the detection wire 3 including the detection wire conductor 31 that has lower bending resistance than the electric wire conductor 21 of the target electric wire 2. If the cable 1 is repeatedly subjected to bending or vibration, the detection wire conductor 31 that has lower bending resistance breaks before the electric wire conductor 21. The occurrence of a break in the detection wire conductor 31 means that the target electric wire 2 is also subjected to a load by bending or vibration and metal fatigue is accumulating in the electric wire conductor 21, and the electric wire conductor 21 of the target electric wire 2 is likely to break if a load continues to be applied. A break in the detection wire conductor 31 can be detected through electric measurement such as measurement of characteristic impedance.

By detecting a break in the detection wire conductor 31 lower in bending resistance in this way, it is possible to detect that there is a precursor of a break in the electric wire conductor 21 of the target electric wire 2 in advance at a stage where no break has actually occurred in the target electric wire 2. As a result of taking measures such as replacing the target electric wire 2 with a new electric wire upon detecting a precursor of a break in the target electric wire 2, problems caused by a break in the target electric wire 2 can be prevented. In this specification, a break in the electric wire conductor 21 of the target electric wire 2 and a break in the detection wire conductor 31 of the detection wire 3 are also simply referred to as a break in the target electric wire 2 and a break in the detection wire 3, respectively.

In the cable 1 according to this embodiment, the tape layer 4 is provided around the outer periphery of the electric wire group G including the target electric wire 2 and the detection wire 3 in close contact with the outer periphery of the electric wire group G, and the sheath 5 is provided around the outer periphery of the tape layer 4. The sheath is formed as an extruded body and is in close contact with the tape layer 4. Since the sheath 5 is formed as an extruded body, the structure of the electric wire group G in which the target electric wire 2 and the detection wire 3 are collected in a predetermined relative arrangement is firmly held by the sheath 5, thus preventing deviation in the positional relationship between the target electric wire 2 and the detection wire 3. This makes it possible to maintain the same positional relationship between the target electric wire 2 and the detection wire 3 regardless of the position in the axial direction of the cable 1. Even when the cable 1 is subjected to an external force such as bending or vibration, the same positional relationship can be easily maintained without deviation occurring at each position in the axial direction of the cable 1.

If the positional relationship between the target electric wire 2 and the detection wire 3 changes depending on the position in the axial direction or with time, even in the case where the same external force is applied to the target electric wire 2 by bending, vibration, or the like, there is a possibility that the relationship between the load exerted on the target electric wire 2 and the load exerted on the detection wire 3 will change depending on the position in the axial direction or with time. In such a case, at the stage where the detection wire conductor 31 of the detection wire 3 is fractured, the degree of metal fatigue accumulated in the electric wire conductor 21 of the target electric wire 2 differs depending on the position in the axial direction or with time. As a result, the degree of urgency to a break in the target electric wire 2 (i.e. the extent of further loading that will cause the target electric wire 2 to actually break), which is indicated by a fracture in the detection wire conductor 31, varies depending on the position or timing. In the cable 1 according to this embodiment, however, the positional relationship between the target electric wire 2 and the detection wire 3 is kept constant regardless of the position in the axial direction of the cable 1 and regardless of the passage of time, as mentioned above. Hence, when an external force such as bending or vibration is applied, the relationship between the load exerted on the target electric wire 2 and the load exerted on the detection wire 3 is easily kept constant. Thus, when the detection wire conductor 31 of the detection wire 3 breaks, the break can be detected as an index indicating that the same amount of metal fatigue has accumulated in the electric wire conductor 21 of the target electric wire 2 and there is a precursor of a break in the target electric wire 2 with the same degree of urgency regardless of the position in the axial direction of the cable 1 and regardless of the timing. That is, a precursor of a break in the target electric wire 2 can be detected accurately with such sensitivity independent of position or time.

In the foregoing embodiment, the electric wire group G is collected by the tape layer 4 and the sheath 5 is provided around the tape layer 4, where the tape layer 4 serves to, for example, enhance the stability of holding the positional relationship between the target electric wire 2 and the detection wire 3 using the sheath 5. However, the tape layer 4 may be omitted from the cable 1. In the case where the tape layer 4 is omitted, the sheath 5 is formed as an extruded body that is directly in close contact with the outer periphery of the electric wire group G. In other words, the sheath 5 is in contact with the surfaces of the electric wires included in the electric wire group G over the entire outer periphery of the electric wire group G, with there being no gap between the sheath 5 and the surfaces of the electric wires included in the electric wire group G except for where it is inevitable. Alternatively, a layer other than the tape layer 4 may be provided between the sheath 5 and the electric wire group G, as is the case with outer detection layers 7 and 8 in the below-described second and third embodiments. In this case, an inner peripheral layer that is an assembly of all layers provided around the outer periphery of the electric wire group G, including the layer other than the tape layer 4, is provided in close contact with the outer periphery of the electric wire group G, and the sheath 5 is provided as an extruded body in close contact with the surface of the inner peripheral layer.

The specific relative arrangement of the target electric wire 2 and the detection wire 3 in the electric wire group G is not limited. In the case where the number of target electric wires 2 is more than one, it is preferable to arrange the plurality of target electric wires 2 so as to surround the detection wire 3, as mentioned above. As a result of the detection wire 3 being located at or near the center of the cable 1 surrounded by the plurality of target electric wires 2, a large force is likely to be applied to the detection wire 3 when the cable 1 is bent. Consequently, a precursor of a break in the target electric wire 2 can be detected sensitively based on a fracture in the detection wire 3. In the case where the number of detection wires 3 is more than one, it is preferable to place the plurality of detection wires 3 together at a position surrounded by the target electric wires 2 rather than positioning the plurality of detection wires 3 apart from each other.

A break in the target electric wire 2 can be detected as long as at least one detection wire 3 is provided in the cable 1. However, by providing a plurality of detection wires 3 as in this embodiment and making the respective detection wire conductors 31 of the detection wires 3 differ in bending resistance, a precursor of a break in the target electric wire 2 can be detected in stages. A detection wire conductor 31 having lower bending resistance breaks at a stage where only a smaller load is applied, i.e. at an earlier stage where little metal fatigue has accumulated in the electric wire conductor 21 of the target electric wire 2. Hence, based on a fracture in the detection wire conductor 31, a precursor of a break in the target electric wire 2 can be detected at a stage well in advance where a break is not so imminent. For example, in the foregoing embodiment, at a stage where only the first detection wire conductor 31A having the lowest bending resistance is fractured, a precursor of a break is detected with a low degree of urgency, indicating that there is still time until an actual break will occur in the target electric wire 2 but a break in the target electric wire 2 is likely to occur eventually. At a stage where the third detection wire conductor 31C is fractured in addition to the first detection wire conductor 31A, an increase in the degree of urgency of a break in the target electric wire 2 is detected. At a stage where the second detection wire conductor 31B is fractured in addition to the first detection wire conductor 31A and the third detection wire conductor 31C, a further increase in the degree of urgency of a break in the target electric wire 2 is detected, indicating that a break is likely to occur in the near future. By detecting the degree of urgency of a break in the target electric wire 2 in stages in this way, it is possible to take measures according to the degree of urgency at each stage. Alternatively, in the case where a plurality of target electric wires 2 that differ in bending resistance, such as the feeder wires 2A and 2B and the signal wires 2C and 2D in the cable 1, are included, a precursor of a break in the target electric wire 2 lower in bending resistance, such as the signal wires 2C and 2D, may be detected based on a fracture in the detection wire conductor 31 lower in bending resistance from among the plurality of detection wire conductors 31, and a precursor of a break in the target electric wire 2 higher in bending resistance, such as the feeder wires 2A and 2B, may be detected based on a fracture in the detection wire conductor 31 higher in bending resistance from among the plurality of detection wire conductors 31.

How many types of detection wire conductors 31 differing in bending resistance are to be included in the cable 1 may be determined as appropriate in accordance with the number of stages at which the degree of urgency of a break occurring in the target electric wire 2 is to be detected. There are various methods of changing the bending resistance of each detection wire conductor 31, such as changing the number, diameter, or material of the strands included in the detection wire conductor 31 serving as a twisted wire conductor, as mentioned above. In the case of providing three types of detection wire conductors 31 differing in bending resistance, it is preferable to form the detection wire conductors 31 using strands 33 made of the first metal material having low bending strength and strands 34 made of the second metal material having higher bending strength than the first metal material, as in the foregoing embodiment. By providing the third detection wire conductor 31C including both strands 33 of the first metal material and strands 34 of the second metal material in addition to the first detection wire conductor 31A including only strands 33 of the first metal material and the second detection wire conductor 31B including only strands 34 of the second metal material, the three types of detection wire conductors 31 differing in bending resistance can be prepared with a simple structure using only strands 33 and 34 of two types of metal materials. Here, the bending resistance of the third detection wire conductor 31C can be adjusted by the ratio of the numbers of strands 33 and 34 of the two types of metal materials. Even when four or more levels of bending resistance are set, detection wire conductors 31 having various bending resistances can be obtained by changing the number of the strands 33 and 34 of the two types of metal materials.

The cable 1 with an abnormality precursor detection function according to this embodiment is capable of detecting a precursor of a break in the target electric wire 2 in advance based on a fracture in the detection wire 3, and can be used in various applications in which there is a possibility of a break occurring in the target electric wire 2. The cable 1 with an abnormality precursor detection function is particularly suitable for use in equipment such as automobiles, where electric wires are frequently subject to bending or vibration due to movement. Especially, the cable 1 with an abnormality precursor detection function is suitably used in applications in which a break in the target electric wire 2 can have significant impact and detecting a precursor of a break in the target electric wire 2 in advance is important, such as the braking system of an automobile.

(3) Electric Wire Abnormality Detection Device

The cable 1 with an abnormality precursor detection function according to this embodiment can detect a precursor of a break in the electric wire conductor 21 of the target electric wire 2 by detecting a fracture in the detection wire conductor 31 of the detection wire 3, as described above. The specific measurement method for detecting a fracture in the detection wire conductor 31 and the specific structure of a detection device for detecting a fracture in the detection wire conductor 31 and recognizing and making a notification thereof as a precursor of a break in the target electric wire 2 are not limited. As a preferred example, an electric wire abnormality detection device (hereinafter also simply referred to as a detection device) according to an embodiment of the present disclosure will be described below.

Figure 2:
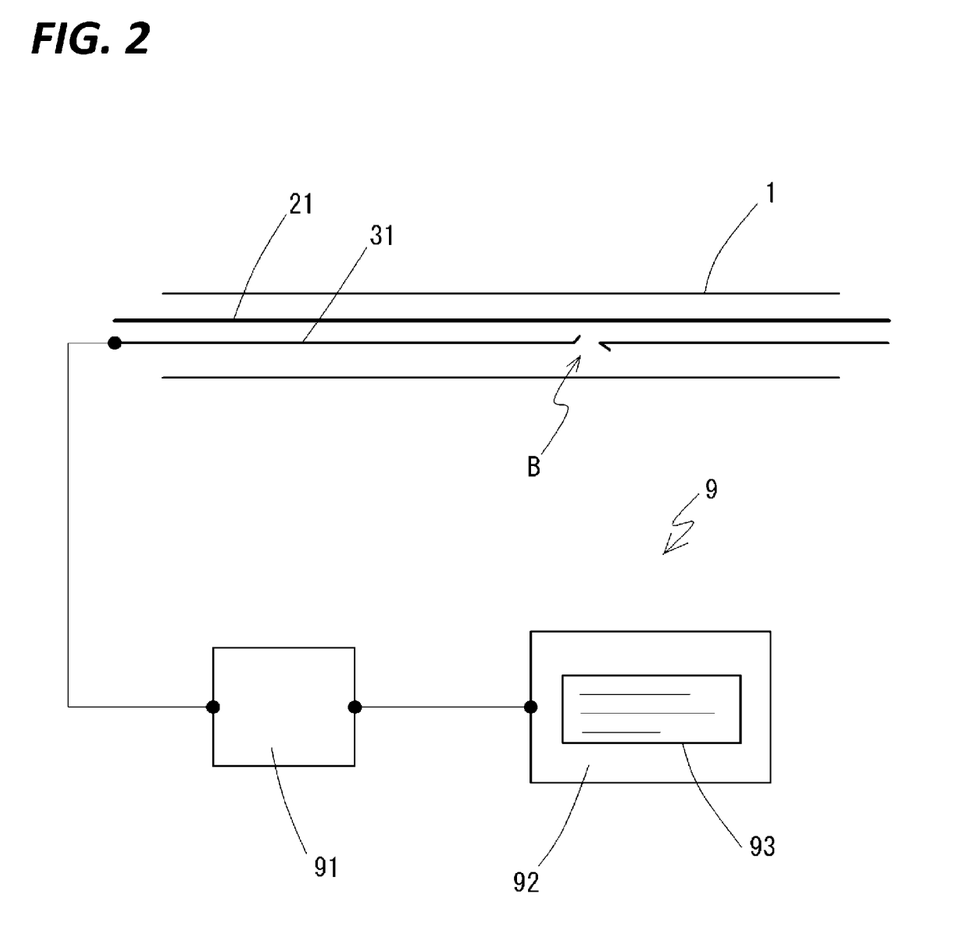
FIG. 2 is a schematic diagram showing the structure of an electric wire abnormality precursor detection device according to an embodiment of the present disclosure in a state where a detection wire conductor has fractured.

FIG. 2 schematically shows the structure of an electric wire abnormality detection device 9 according to an embodiment of the present disclosure. The detection device 9 detects a precursor of a break in the electric wire conductor 21 of the target electric wire 2 as a precursor of an electric wire abnormality, for the cable 1 with an abnormality precursor detection function according to the first embodiment of the present disclosure described above. In FIG. 2, only one electric wire conductor 21 of the target electric wire 2 and one detection wire conductor 31 of the detection wire 3 are shown as constituent members of the cable 1, for the sake of simplicity. A state in which a fracture B has occurred in the detection wire conductor 31 is shown in FIG. 2.

The detection device 9 includes a measurement unit 91 and a notification unit 92. The measurement unit 91 measures the characteristic impedance of the detection wire conductor 31 of the detection wire 3 in the cable 1 using an abnormality precursor detection function, to inspect whether the fracture B has occurred in the detection wire conductor 31. The characteristic impedance is measured by inputting an inspection signal including an AC component to the detection wire conductor 31 and detecting a response signal using a reflection method or a transmission method. When the fracture B has occurred in an intermediate part of the detection wire conductor 31, the inspection signal is reflected at the fracture B, so that a discontinuous change occurs in the response signal. Hence, in the case where a change in the characteristic impedance measured by the measurement unit 91 is not less than a reference value, it can be determined that the fracture B has occurred in the detection wire conductor 31 and there is a precursor of a break in the electric wire conductor 21 of the target electric wire 2. The reference value may be determined in advance as a threshold for the amount of change that is to be considered as resulting from a fracture in the detection wire conductor 31, based on actual measurement results when no fracture B has occurred in the detection wire conductor 31. In the case where the cable 1 includes a plurality of detection wire conductors 31 differing in bending resistance as in the foregoing embodiment, by measuring the characteristic impedance for each detection wire conductor 31, it is possible to identify the detection wire conductor 31 having the fracture B and detect a precursor of a break in the target electric wire 2, in stages. The characteristic impedance also changes due to such damage to the detection wire conductor 31 that does not lead to a fracture. Although a change in characteristic impedance due to a fracture is described as a typical example in this specification, a change in characteristic impedance due to damage to the detection wire conductor 31 other than a fracture can be equally used to detect a precursor of a break in the target electric wire 2.

The detection of the fracture B in the detection wire conductor 31 may be performed through electric measurement other than characteristic impedance measurement, such as resistance value measurement. The measurement of the characteristic impedance, however, enables high-sensitivity detection of the fracture B in the detection wire conductor 31. In particular, in the case of measuring the characteristic impedance using the reflection method, the characteristic impedance can be measured by simply connecting the measurement unit 91 to only one end of the cable 1 as shown in FIG. 2, with there being no need to connect the measurement unit 91 to both ends of the cable 1. Therefore, even in the case where the cable 1 is located somewhere that cannot be easily accessed or has a complex route as in the interior of a vehicle, a precursor of a break in the target electric wire 2 can be detected as long as the measurement unit 91 can be connected to one end of the detection wire conductor 31, without removing the electric wire or removing an obstacle. Moreover, measuring the characteristic impedance of the detection wire conductor 31 through time domain reflectometry (TDR) makes it possible to identify not only whether the fracture B has occurred in the detection wire conductor 31 but also the position of the fracture B. The measurement of the characteristic impedance may be performed between the detection wire conductor 31 to be measured and ground potential, or between the detection wire conductor 31 to be measured and another detection wire conductor 31 or an electric wire conductor 21.

The notification unit 92 receives a signal from the measurement unit 91. In the case where the measurement unit 91 has determined that the characteristic impedance of the detection wire conductor 31 changes by not less than the reference value and a break has occurred in the detection wire conductor 31, the notification unit 92 makes a notification to the outside regarding a precursor of a break in the target electric wire 2, i.e. that there is a precursor of a break in the electric wire conductor 21 of the target electric wire 2. The specific method of making a notification to the outside is not limited. Examples of the method include visual notification through a display panel 93 provided in the equipment such as an automobile in which the cable 1 is located, and notification by an alarm sound. Alternatively, the notification unit 92 may be provided as an interlocking device that restricts part or all of the functions of the equipment. In the case where the cable 1 includes a plurality of detection wire conductors 31 differing in bending resistance, the notification unit 92 makes different notifications depending on which detection wire conductor 31 the fracture B has occurred in. In this way, a notification regarding a precursor of a break in the target electric wire 2 can be made in stages according to the degree of urgency.

In equipment such as an automobile in which the cable 1 is located, the aforementioned detection device 9 is preferably constantly connected to the cable 1 to continuously measure the characteristic impedance using the measurement unit 91 and to constantly monitor whether there is a precursor of a break in the target electric wire 2. Thus, if there is a precursor of a break in the target electric wire 2, the precursor can be detected promptly and a notification regarding this fact can be made to the user of the equipment or the like via the notification unit 92. The user who has received the notification can promptly take measures such as replacing the cable 1, and consequently can use the equipment for a long time without issue. For example, in the case where the possibility or frequency of a break in the target electric wire 2 is low, instead of constantly monitoring for a precursor of a break in the target electric wire 2 using the detection device 9, the detection device 9 may be connected to the cable 1 only at a predetermined timing such as at the time of periodic inspection of the equipment in which the cable 1 is located, to inspect whether or not there is a precursor of a break in the target electric wire 2.

Second Embodiment

In the first embodiment described above, a precursor of a break in the electric wire conductor 21 of the target electric wire 2 due to the accumulation of metal fatigue is detected using, as an index, a fracture in the detection wire conductor 31 of the detection wire 3. However, there is also a possibility of damage in an electric wire besides a break in a conductor due to metal fatigue. For example, while a break in the conductor due to metal fatigue progresses over a long period of time as a result of repeated bending or vibration, a sudden large impact on the electric wire due to an external force or the like may also cause the conductor to break. Moreover, contact, friction, or the like with an external object may cause an external flaw in the electric wire and lead to a fracture of the insulation covering or the conductor. The detection method using a fracture in the detection wire 31 in the first embodiment can sensitively detect a precursor of a break in the electric wire conductor 21 due to metal fatigue, but may be unable to sensitively detect a precursor of a break in the electric wire conductor 21 due to a sudden impact or a precursor of an external flaw in the target electric wire 2 due to contact or friction with an external object. In view of this, in respective cables 1' and 1" with an abnormality precursor detection function according to the second and third embodiments described below, an outer detection layer is provided in addition to the detection wire 3 so that a precursor of damage in the target electric wire 2 caused by such an impact or external flaw can be detected as well as a precursor of a break due to metal fatigue.

The outer detection layer is conductive tape 7 shown in FIGS. 3A and 3B in the second embodiment, and laminated tape 8 shown in FIGS. 4A to 4C in the third embodiment, as described in detail later. Each of these outer detection layers is a layer-like member including a conductive member, and is located between the sheath 5 and the electric wire group G. Although each of the outer detection layers 7 and 8 is located around the outer periphery of the tape layer 4 in the drawings, the outer detection layer may be located on the inner side of the tape layer 4, i.e. at a position in contact with the electric wire group G. In either case, the assembly of the outer detection layer and the tape layer 4 is regarded as the inner peripheral layer, and the sheath 5 is formed as an extruded body in close contact with the surface of the assembly. Although the purpose of detecting a precursor of damage in the target electric wire 2 can be achieved even if the outer detection layer is located around the outer periphery of the sheath 5, the outer detection layer is located on the inner side of the sheath 5 from the viewpoint of protecting the outer detection layer from an external environment, in order to continue accurate damage detection.

Since the outer detection layer is located outside the detection wire 3 with respect to the center of each of the cables 1' and 1", when the cable is subjected to a sudden large impact by an external force or subjected to contact or friction with an external object, the outer detection layer is more likely to be placed under a large load and fracture than the detection wire 3. Hence, by detecting a fracture in the outer detection layer, a precursor of damage in the target electric wire 2 due to an impact or an external flaw can be sensitively detected. The outer detection layer is not limited to the conductive tape 7 or the laminated tape 8 described later, and may be any layer that includes a conductive member. The conductive member included in the outer detection layer is preferably a metal layer having a thickness smaller than the outer diameter of the detection wire conductor 31 of the detection wire 3 (in FIGS. 3B, 4B, and 4C, the metal layers 7 and 82 are shown to be thick for the sake of clarity). Thus, when the cable is subjected to a sudden impact that does not lead to a fracture in the detection wire 3 or subjected to contact or friction with an external object, the conductive member of the outer detection layer is likely to fracture, so that a precursor of damage in the target electric wire 2, which cannot be detected by the detection wire 3 alone, can be sensitively detected using the outer detection layer.

As the second and third embodiments of the present disclosure, examples of the cables 1' and 1" with an abnormality precursor detection function respectively including the outer detections layer 7 and 8 in addition to the detection wire 3 and electric wire abnormality precursor detection devices for the cables 1' and 1" with an abnormality precursor detection function will be described in detail below. The respective cables 1' and 1" with an abnormality precursor detection function according to the second and third embodiments have the same structure as the cable 1 with an abnormality precursor detection function according to the foregoing first embodiment except that the outer detection layers 7 and 8 are included. The description of the same components as those in the cable 1 with an abnormality precursor detection function and the electric wire abnormality precursor detection device 9 according to the first embodiment are omitted here.

Figure 3A:
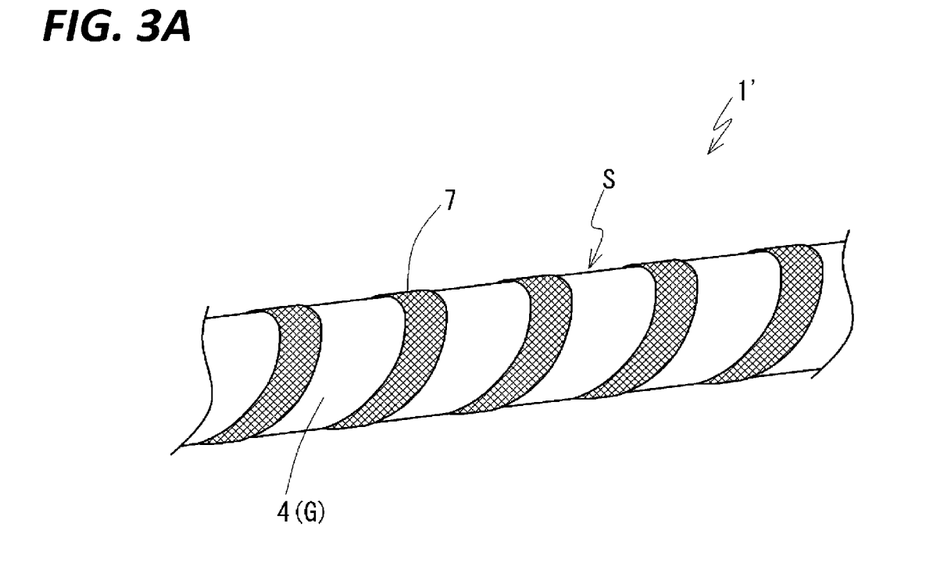
FIG. 3A is a perspective view showing the structure of a cable with an abnormality precursor detection function according to a second embodiment of the present disclosure in a state without a sheath.
Figure 3B:
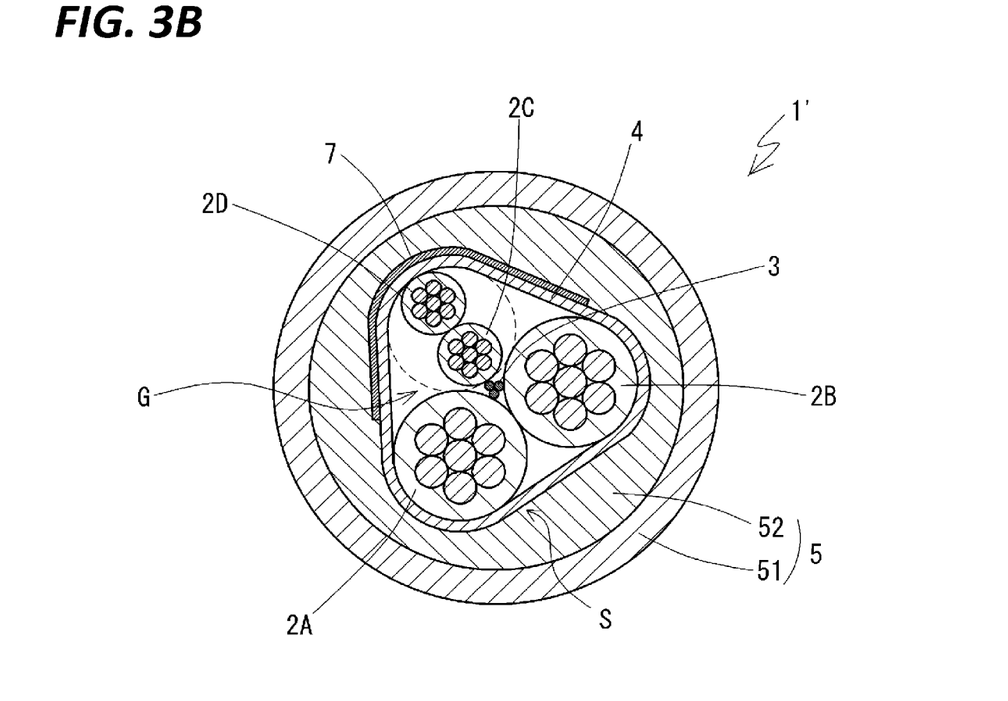
FIG. 3B is a cross-sectional view showing the structure of the cable with an abnormality precursor detection function according to the second embodiment.

FIGS. 3A and 3B show the structure of the cable 1' with an abnormality precursor detection function according to the second embodiment of the present disclosure. FIG. 3A is a perspective view with the sheath 5 omitted, and FIG. 3B is a cross-sectional view perpendicular to the axial direction, including the sheath 5. The cable 1' includes the outer detection layer 7 composed of conductive tape, around the outer periphery of the tape layer 4.

The conductive tape 7 is a conductive tape body. The conductive tape 7 is spirally wound around the electric wire group G collected by the insulating tape layer 4, along the axial direction of the electric wire group G. The conductive tape 7 is wound loosely in a spiral shape so that a gap S not occupied by the conductive tape 7 is present between adjacent turns. At the gaps S between the turns, the insulating tape layer 4 wound around the electric wire group G is exposed without being covered with the conductive tape 7.

The conductive tape 7 may be made of any material that contains a conductive material, but preferably contains a metal layer as the conductive material. In this case, the conductive tape 7 may be formed entirely as a metal foil made of a metal material, or may be formed by forming a layer of a metal material on a surface of a substrate. In the case of using a substrate, the substrate may be made of an insulating material such as an organic polymer material as long as a layer of a metal material is formed on at least a surface of the substrate facing outward in a state in which the conductive tape 7 is wound around the electric wire group G. The thickness of the layer of the conductive material forming the conductive tape 7 is preferably smaller than the diameter of each detection wire conductor 31, as mentioned above.

If the cable 1' is subjected to a sudden large impact due to the sudden application of an external force or the like or subjected to such an external flaw that factures the sheath 5 due to contact or friction with an external object, the conductive tape 7 may facture. Since the conductive tape 7 is located outside the target electric wire 2, such impact or external flaw may not immediately damage the target electric wire 2 but cause the conductive tape 7 to fracture. In this case, the target electric wire 2 may also be subjected to a load that can lead to a break in the electric wire conductor 21 due to impact or a break in the electric wire coating 22 or the electric wire conductor 21 due to an external flaw. By detecting a fracture in the conductive tape 7, it is possible to detect that there is a precursor of damage in the target electric wire 2 due to the application of a load to the target electric wire 2.

In the cable 1' according to this embodiment, a precursor of a break in the target electric wire 2 mainly caused by metal fatigue can be detected from a fracture in the detection wire 3, and a precursor of damage in the target electric wire 2 mainly caused by an impact or an external flaw can be detected from a fracture in the conductive tape 7 provided as the outer detection layer. Thus, by providing both the detection wire 3 and the outer detection layer 7 in the cable 1', precursors of various kinds of damage in the target electric wire 2 can be detected as compared with the cable 1 according to the first embodiment including only the detection wire 3.

It is preferable to detect a fracture in the conductive tape 7 through characteristic impedance measurement, particularly measurement using a reflection method, as with a fracture in the detection wire conductor 31. When the conductive tape 7 fractures, the reflection of an inspection signal causes a discontinuous change in the characteristic impedance. The measurement of the characteristic impedance of the conductive tape 7 may be performed between the conductive tape 7 and ground potential, or between the conductive tape 7 and a detection wire conductor 31 or an electric wire conductor 21. Measuring the characteristic impedance of the conductive tape 7 using TDR makes it possible to identify not only whether the conductive tape 7 has a fracture but also the position of the fracture, as with the detection wire conductor 31. The characteristic impedance of the conductive tape 7 also changes due to such damage to the conductive tape 7 that does not lead to a fracture. Although a change in characteristic impedance due to a fracture in the conductive tape 7 is described as a typical example in this specification, a change in characteristic impedance due to damage to the conductive tape 7 other than a fracture can be equally used to detect a precursor of damage in the target electric wire 2.

The conductive tape 7 serving as the outer detection layer is not limited to having a specific arrangement as long as it surrounds the electric wire group G, but spirally winding the conductive tape 7 with a gap S between turns as mentioned above enables more sensitive detection of a change in characteristic impedance due to a fracture than in the case where the conductive tape 7 surrounds the entire outer periphery of the electric wire group G, such as spiral winding without a gap S between turns. This is because, when the conductive tape 7 is fractured due to an external flaw or the like, the rate of change in the area of the region covered by the conductive tape 7 in a cross section at each position in the axial direction of the cable 1' (i.e. the rate of change relative to the state before the fracture) increases, and as a result the rate of change in the characteristic impedance increases. Regarding the size of the gap S, for example, the area ratio of the region exposed as the gap S not covered by the conductive tape 7 may be 50% or more. Moreover, it is preferable to set the spiral pitch so that the length of an expected external flaw in the axial direction will be sufficiently large with respect to the pitch of the spiral shape of the conductive tape 7, in order to enable sensitive detection of a fracture in the conductive tape 7 due to an external flaw or the like regardless of the position in the axial direction of the cable 1'.

To detect a precursor of damage in the target electric wire 2 for the cable 1' that includes the layer of the conductive tape 7 as the outer detection layer in addition to the detection wire 3, the electric wire abnormality precursor detection device 9 is configured to measure, using the measurement unit 91, the characteristic impedance of the conductive tape 7 serving as the outer detection layer in addition to the characteristic impedance of the detection wire conductor 31. When the characteristic impedance of the conductive tape 7 changes by not less than a reference value, it is determined that the conductive tape 7 has fractured and there is a precursor of damage in the target electric wire 2. The reference value may be determined in advance as a threshold for the amount of change that is to be considered as resulting from a fracture in the conductive tape 7, based on actual measurement results when there is no fracture in the conductive tape 7. As a measurement device included in the measurement unit 91, a common device or independent devices may be used to measure the characteristic impedance of the detection wire conductor 31 and the characteristic impedance of the outer detection layer 7.

The notification unit 92 makes a notification, based on the measurement by the measurement unit 91, to the outside that there is a precursor of damage in the target electric wire 2 when the characteristic impedance of the conductive tape 7 forming the outer detection layer changes by not less than the reference value, in addition to making a notification to the outside that there is a precursor of damage in the target electric wire 2 when the characteristic impedance of the detection wire conductor 31 changes by not less than the reference value. As mentioned above, a change in the characteristic impedance of the detection wire conductor 31 can be used to sensitively detect a precursor of a break in the electric wire conductor 21 of the target electric wire 2 due to metal fatigue, whereas a change in the characteristic impedance of the outer detection layer 7 can be used to sensitively detect a precursor of damage in the electric wire conductor 21 or the electric wire coating 22 of the target electric wire 2 due to a sudden impact or an external flaw. It is preferable that the notification unit 92 makes notifications that differ between when a change in the characteristic impedance of the detection wire conductor 31 is not less than the reference value and when a change in the characteristic impedance of the outer detection layer 7 is not less than the reference value so that the two cases are distinguishable from each other. In this way, the type and cause of damage whose precursor appears in the detection wire conductor 31 can be identified by the user or the like.

Third Embodiment

The third embodiment of the present disclosure in which the outer detection layer is formed using the laminated tape 8 instead of the conductive tape 7 in the second embodiment will be described below. The description of the same components as those in the second embodiment is omitted here.

Figure 4A:
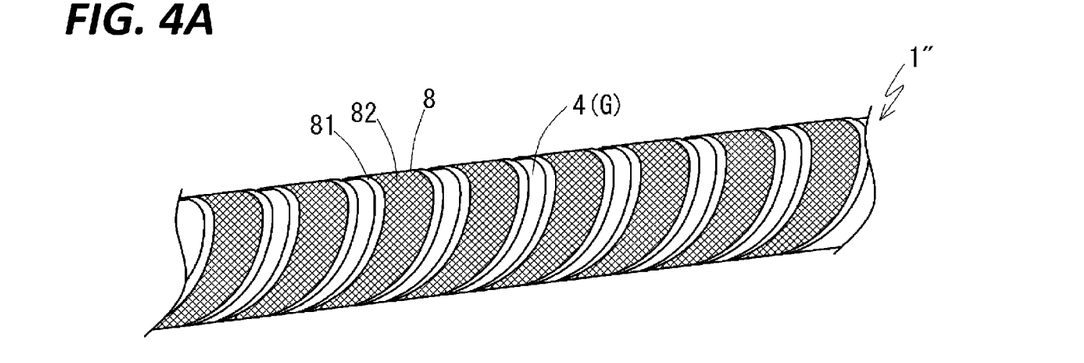
FIG. 4A is a perspective view showing the structure of a cable with an abnormality precursor detection function according to a third embodiment of the present disclosure in a state without a sheath.
Figure 4B:
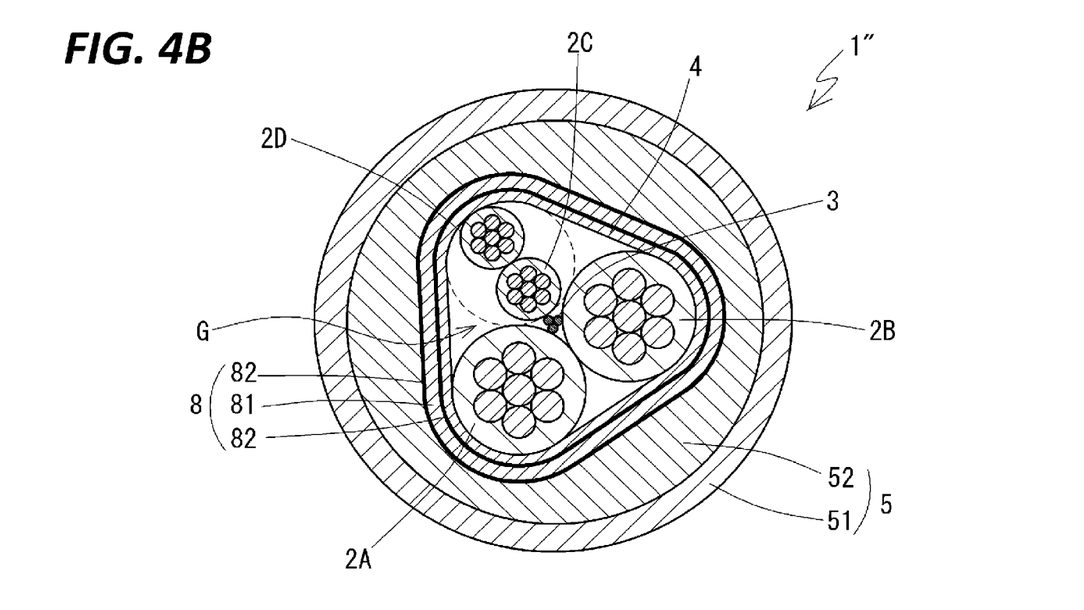
FIG. 4B is a cross-sectional view showing the structure of the cable with an abnormality precursor detection function according to the third embodiment.

FIGS. 4A and 4B show the structure of the cable 1" with an abnormality precursor detection function according to the third embodiment of the present disclosure. FIG. 4A is a perspective view with the sheath 5 omitted, and FIG. 4B is a cross-sectional view perpendicular to the axial direction, including the sheath 5. The cable 1" according to the third embodiment includes the outer detection layer formed by the laminated tape 8, around the outer periphery of the electric wire group G collected by the tape layer 4. The laminated tape 8 is not limited to having a specific arrangement as long as it surrounds the electric wire group G. In the drawings, the laminated tape 8 is spirally wound around the electric wire group G. A gap may or may not be provided between turns in the spiral shape of the laminated tape 8.

Figure 4C:
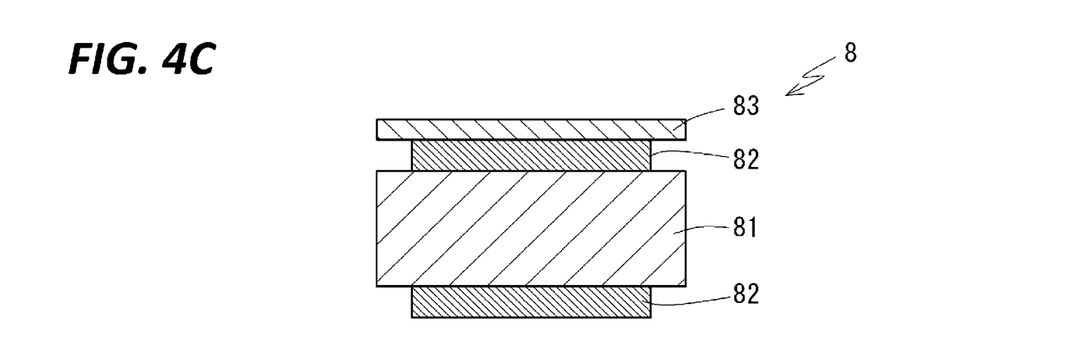
FIG. 4C is a cross-sectional view for describing the laminated structure of laminated tape included in the cable with an abnormality precursor detection function.

The laminated tape 8 has a structure in which conductive covering layers 82 are formed on two surfaces of a substrate 81 that is a tape-shaped insulator or semiconductor, as shown in a cross-sectional view (a cross section orthogonal to the longitudinal direction of the tape) in FIG. 4C. In the laminated tape 8, the two covering layers 82 on two surfaces function as conductive members of the outer detection layer. In the laminated tape 8, the material of the substrate 81 is not limited as long as it is an insulator or a semiconductor, but insulating non-woven fabric tape is particularly preferable from the viewpoint of ensuring flexibility and thickness. The material of the covering layers 82 is not limited as long as it is a conductive material, but a metal such as copper or a copper alloy or aluminum or an aluminum alloy is preferable. An adhesive tape 83 may be provided as appropriate on the surface of one covering layer 82. The adhesive tape 83 can be used to fix the laminate tape 8 in a state of being wound around the cable 1".

When the cable 1" according to the third embodiment is subjected to a sudden large impact or an external flaw due to contact or friction with an external object, the laminated tape 8 may be damaged. By detecting such damage in the laminated tape 8, it is possible to detect a precursor of damage in the target electric wire 2 due to an impact or an external flaw. Damage to the laminated tape 8 can be detected by measuring the characteristic impedance between the two conductive covering layers 82. In a state in which the laminated tape 8 is not damaged, the two covering layers 82 each exist as a conductive continuous body extending along the longitudinal direction of the laminated tape 8 while being insulated from each other by the substrate 81, and have a conductance determined by the material, thickness, etc. of each of the substrate 81 and the covering layers 82. If at least one of the two covering layers 82 fractures due to a fracture in the laminated tape 8 or the two covering layers 82 are short-circuited due to the laminated tape 8 being penetrated by a conductive substance or the laminated tape 8 being placed under pressure, the conductance between the two covering layers 82 changes. The change in the conductance component is observed as a change in the characteristic impedance between the two covering layers 82.

The electric wire abnormality precursor detection device 9 for the cable 1" according to the third embodiment monitors, using the measurement unit 91, the characteristic impedance of the detection wire conductor 31 and the characteristic impedance between the two covering layers 82 of the laminated tape 8 forming the outer detection layer. Not only when the characteristic impedance of the detection wire conductor 31 changes by more than a reference value but also when the characteristic impedance between the two covering layers 82 of the laminated tape 8 changes by more than a reference value, the notification unit 92 makes a notification to the outside that there is a precursor of damage in the target electric wire 2 so that the two cases are distinguishable from each other.

Moreover, by forming the substrate 81 of the laminated tape 8 as a semiconductor and monitoring the characteristic impedance between the two covering layers 82 in a state in which such a low voltage that does not cause a short circuit via the substrate 81 is applied between the two covering layers 82, the damage precursor detection sensitivity can be further enhanced. This is because, when the laminated tape 8 is subjected to an external force such as pressure, there is a possibility that, even if the external force is not of such a magnitude that causes a short circuit between the two covering layers 82 due to physical contact, a short circuit occurs between the two covering layers 82 due to dielectric breakdown and a change in characteristic impedance is detected as a result.

Although the embodiments of the present disclosure have been described in detail above, the present invention is not limited to the foregoing embodiments, and various modifications can be made without departing from the gist of the present invention.

LIST OF REFERENCE NUMERALS 1, 1', 1" Cable (with abnormality precursor detection function)
2 Target electric wire
2A, 2B Feeder wire
2C, 2D Signal wire 21 (21A to 21D) Electric wire conductor
22 Electric wire coating
3 Detection wire
3A First detection wire
3B Second detection wire
3C Third detection wire
31 Detection wire conductor
31A First detection wire conductor
31B Second detection wire conductor
31C Third detection wire conductor
32 Detection wire coating
33 Strand of first metal material
34 Strand of second metal material
4 Tape layer
5 Sheath
51 Outer layer
52 Inner layer
7 Conductive tape (outer detection layer)
8 Laminated tape (outer detection layer)
81 Substrate
82 Covering layer
83 Adhesive tape
9 (Electric wire abnormality precursor) detection device
91 Measurement unit
92 Notification unit
93 Display panel
B Fracture in detection wire conductor
G Electric wire group
S Gap

What is claimed is:

1. A cable with an abnormality precursor detection function, comprising:
one or more target electric wires each including an electric wire conductor and an electric wire coating that covers an outer periphery of the electric wire conductor;
one or more detection wires each including a detection wire conductor and a detection wire coating that covers an outer periphery of the detection wire conductor; and
a sheath that covers an outer periphery of an electric wire group including the one or more target electric wires and the one or more detection wires,
wherein the detection wire conductor has lower bending resistance than the electric wire conductor,
the sheath is an extruded body that is directly in close contact with the outer periphery of the electric wire group or is in close contact with a surface of an inner peripheral layer that is in close contact with the outer periphery of the electric wire group and covers the electric wire group,
the one or more detection wires comprise a plurality of detection wires,
respective detection wire conductors included in the plurality of detection wires differ in bending resistance from each other,
the plurality of detection wires include a first detection wire including a first detection wire conductor and a second detection wire including a second detection wire conductor,
the first detection wire conductor is composed of a strand of a first metal material, and
the second detection wire conductor is composed of a strand of a second metal material that has higher bending resistance than the first metal material,
the plurality of detection wires further include a third detection wire including a third detection wire conductor, and the third detection wire conductor includes both a strand of the first metal material and a strand of the second metal material, and has a bending resistance that is higher than the bending resistance of the first detection wire conductor and lower than the bending resistance of the second detection wire conductor.

2. The cable with an abnormality precursor detection function according to claim 1,
wherein the one or more target electric wires comprise a plurality of target electric wires, and
the plurality of target electric wires surround the plurality of detection wires.

3. The cable with an abnormality precursor detection function according to claim 1, further comprising
an outer detection layer that is a layer-like member including a conductive member, between the sheath and the electric wire group.

4. The cable with an abnormality precursor detection function according to claim 3,
wherein the conductive member included in the outer detection layer is a metal layer having a thickness less than a diameter of the detection wire conductor.

5. The cable with an abnormality precursor detection function according to claim 3,
wherein the outer detection layer is composed of conductive tape, and surrounds the electric wire group.

6. The cable with an abnormality precursor detection function according to claim 5,
wherein the conductive tape is spirally wound around the electric wire group with a gap between turns.

7. The cable with an abnormality precursor detection function according to claim 3,
wherein the outer detection layer is composed of laminated tape, and
the laminated tape includes a substrate that is a tape-shaped insulator or semiconductor and conductive covering layers formed on two surfaces of the substrate, and surrounds the electric wire group.

8. An electric wire abnormality precursor detection device comprising:
a measurement unit; and
a notification unit,
wherein the measurement unit is configured to measure a characteristic impedance of the detection wire conductor in the cable with an abnormality precursor detection function according to claim 1, and
the notification unit is configured to make a notification to the outside of a precursor of a break in the target electric wire, in the case where a change in the characteristic impedance of the detection wire conductor measured by the measurement unit is not less than a reference value.

9. The electric wire abnormality precursor detection device according to claim 8,
wherein the measurement unit is configured to measure, in addition to the characteristic impedance of the detection wire conductor, a characteristic impedance of a conductive member included in an outer detection layer in the cable with an abnormality precursor detection function, and the outer detection layer is a layer-like member between the sheath and the electric wire group, and
the notification unit is configured to make a notification to the outside of a precursor of damage in the target electric wire, in the case where a change in the characteristic impedance of the conductive member measured by the measurement unit is not less than a reference value.

* * * * *